UNITED STATES PATENT OFFICE.

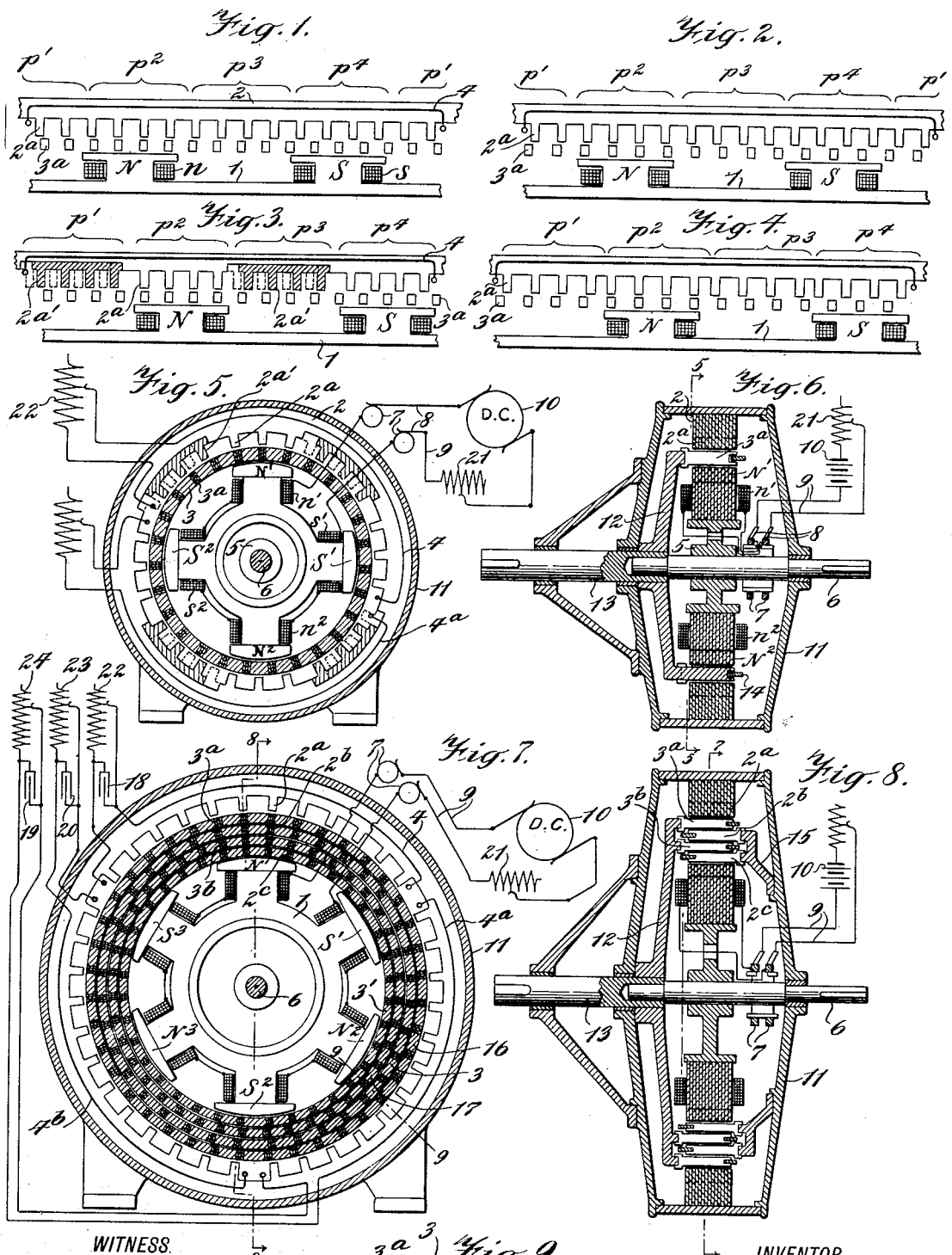

ALFONS H. NEULAND, OF NEW YORK, N. Y.

INDUCTION DEVICE.

1,227,185.   Specification of Letters Patent.   Patented May 22, 1917.

Application filed September 1, 1915. Serial No. 48,467.

*To all whom it may concern:*

Be it known that I, ALFONS H. NEULAND, a subject of the Czar of Russia, residing at the city of New York, in the borough of Manhattan and State of New York, have invented certain new and useful Improvements in Induction Devices, of which the following is a full, clear, and exact description.

My invention relates to power transmission devices and particularly to such devices of the electro-magnetic or induction type, being adapted to transmit power from one rotating member to another, as from one shaft to another.

An object of my invention is to provide such a device which will be simple, powerful and efficient. Another object is to provide a device which will change the low torque and high speed of the driving shaft into a high torque and low speed of the driven shaft. Another object is to cause one shaft or element, when in electrical synchronism, to rotate at a lower velocity than the other element. Another object is to enable the speed of the driven member to be changed without changing that of the driver. Another object is to provide for the rotation of the driven member either with or against the direction of the driver. Another object is to generate a current in an induced winding by the rotation of either or both of two rotatable members. Another object is to cause a rotatable member to be acted on by a revolving field and causing said member to rotate in opposition to said field. Still other objects and advantages of my invention will appear from the following description. In accordance with my invention, I cause a rotating magnetic field to act and produce a torque on a rotatable member through an air gap of varying reluctance, causing said rotatable member, when in electrical synchronism with the field, to rotate at a lower angular velocity than the field.

My invention comprehends a driven rotatable member which has a plurality of spaced magnetic conductors coöperative with spaced magnetic conductors on a stationary member arranged in close relation therewith, and forming one or more sections in each of which the conductors are alined in one portion and staggered or fully off-set in another portion, while in still other portions they are partially alined, being partially off-set in one direction on one side of the fully alined portion and partially off-set in the opposite direction on the other side of the fully alined portion. The two members are traversed by a revolving magnetic field in which the poles of opposite polarity are spaced apart the distance between the alined and fully off-set portions, and an induced circuit is provided which surrounds the section and in which a current is induced as the field progresses from one portion to another.

The driven element develops a torque by reason of the induced current in the winding produced by the rotation of the field system which coöperates with the field system so as to strengthen the flux at one partly alined portion and weaken it at the other partly alined portion at the moment when the poles are under the partly alined portions, thus forcing the magnetic conductors at the strengthened portion to aline themselves without being opposed from so doing by the other partly alined portion due to its weakened condition.

Preferably the field system comprises a plurality of magnets rotated by the prime or driver member, the adjacent magnets being oppositely magnetized so that they present pole faces of opposite polarity to the magnetic conductors.

My invention also comprehends means for varying the strength of the magnetic field.

My invention also comprehends means for varying the resistance of the induced circuit.

My invention also comprehends means for supplying a leading magnetizing current to the secondary or induced circuit, which in the preferred form is done by means of a condenser in the induced circuit.

My invention also comprehends various other features of construction and combinations of parts as will hereinafter more fully appear. I shall now describe the embodiments of my invention illustrated in the accompanying drawings and shall thereafter point out my invention in claims.

Figures 1 to 4, inclusive, are developments of the stationary member, the rotatable or driven member, and the rotative field member of four modified embodiments of my invention;

Fig. 5 is a transverse section of an embodiment of my invention taken on the line 5—5 of Fig. 6, and showing the magnetizing circuit and the induced circuits in diagram;

Fig. 6 is a longitudinal central section of the same;

Fig. 7 is a view similar to Fig. 5 and taken on the line 7—7 of Fig. 8, showing another modified embodiment of my invention;

Fig. 8 is a longitudinal section of the same taken on the broken line 8—8 of Fig. 7;

Fig. 9 is a sectional detail of the coöperating magnetic conductors of the stationary and rotatable members, taken on the line 9—9 of Fig. 7.

The machine comprises three principal elements, a rotatable field system, preferably the driver; a stationary member and a second rotatable member, preferably the driven member.

A linear representation of the three elements is shown in Fig. 1. The driving field 1 has a pair of oppositely magnetizing poles N and S, which are preferably laminated to accommodate the varying flux. The magnetizing winding $s$ and $n$ surround the pole pieces and are energized by a source of direct current which is not shown in Fig 1. A decrease in the flux of one pole is compensated by a corresponding increase in the flux of the other pole as the magnet system progresses, and consequently the direct current in the magnetizing coils remains substantially constant. Means which are not shown in Fig. 1 are provided for completing separate paths for the two fluxes so that the quantity of the flux is chiefly determined by the reluctance of the two paths, and the difference in the two fluxes is therefore enabled to complete its circuit when the flux in one pole is at its maximum, and the other at its minimum, or when one flux is greater than the other.

The stationary element 2, which is also preferably laminated, surrounds the field system and is provided on its inner circumference with a plurality of spaced flux conductors or teeth $2^a$.

The rotatable or driven member comprises a series of spaced laminated magnetic flux conductors or bars $3^a$, arranged in the space intermediate of the stationary member and the field member. The relation of the stationary to the rotatable flux conductors is such that the two series of conductors are alined at one point and staggered or fully off-set at another point and are partly alined at intermediate points; or in other words, the flux conductors of the two members coöperate to form one or more sections having successive portions $p'$, $p^2$, $p^3$ and $p^4$ in which the conductors of the two members are respectively off-set in one direction, alined, off-set in the opposite direction, and fully off-set.

In the construction shown in Fig. 1, this relation results from the fact that while the flux conductors of both the stationary and rotatable members are evenly spaced, they have a different pitch. As shown in this construction, the section illustrated contains sixteen equally spaced stationary flux conductors $2^a$, and seventeen equally spaced rotatable conductors $3^a$, and it is evident that in such a construction, the rotation of the rotatable bars with respect to the stationary teeth for a distance equal to the pitch of the rotatable bars will cause a progression of the point of alinement throughout the length of the entire section; or in other words, the ratio of movement between the rotatable members and the flux path formed at the point of alinement is 1 to 17.

The pole pieces N and S are spaced apart approximately the distance between the alined and fully off-set portions, and therefore when one pole substantially opposes the alined portion, the other substantially opposes the staggered portion.

An induced winding 4 is provided upon the stationary member which spans approximately the distance of twice the pole pitch; or in other words, surrounds the section which contains the four portions $p'$, $p^2$, $p^3$, and $p^4$.

As long as the driven rotatable element; that is, the rotatable series of bars $3^a$, is stationary, a progression of the field system will alternately bring the north and south poles opposite the alined portion, thus causing the flux to alternate through the coil and generate a current therein, the frequency of which is determined by the speed of the field magnet. If the series of rotatable bars $3^a$ were rotated in such a way that the point of alinement were made to rotate in the same direction as the field system, the frequency of the generated current in the coil 4 would be decreased and would be zero if the velocity of the progressing alined path were equal to the speed of the magnet system. If on the other hand, the point of alinement were made to rotate in opposition to the field poles, the frequency would thereby be increased and would be equal to the sum of the frequencies of the rotating field and alined portion.

The driven rotatable member and the driving field member are in electrical synchronism when the flux path or alined portion rotates in the same direction and at equal speed with the field member, and as above pointed out, due to the relation between the stationary and rotatable flux conductors, the driving field member is in electrical synchronism with the driven rotatable member when the latter rotates at a much lower speed than the field member.

A torque is developed in the driven member by reason of the current which is induced in the winding 4 by the rotation of the field member 1, and this induced current in turn coöperates with the field of the field member and strengthens the flux at one portion in which the conductors are partly alined and weakens the flux at the other portion in which the conductors are partly alined. With the members in the position shown in Fig. 1, where the pole N opposes the alined portion and the pole S opposes the staggered portion, the induced coil 4 surrounding both poles is traversed by a north magnetic flux. The movement of the field member in a clockwise direction causes the north flux through the coil to decrease and also causes the south flux to increase until the poles reach a point where the north pole opposes the partly alined portion $p^3$, and the south pole opposes the partly alined portion $p'$. At this instant, the north flux through the coil is equal to the south flux and hence the active flux is zero. The change from a maximum north flux to a zero flux through the coil during such progression of the field induces a current in the coil which has the same direction as the magnetizing current of the north pole, and reaching its maximum when the poles are under the partly alined portions, and therefore creates a field in the area surrounded by the coil which is of the same direction as that of the north pole, this created north field combining with the field of the north pole under the portion $p^3$ and causing the driven member to progress in a clockwise direction.

The created north field, however, opposes the field of the south pole under the portion $p'$ and weakens it, and thus reduces or eliminates the counter pull which would otherwise exist at this point and which would tend to cause rotation in the opposite direction. In this way the induced current coöperates with the rotating field and forces the magnetic conductors at the strengthened portion to aline themselves with negligible opposition from the other partly alined portion; thus a unidirectional torque impulse is produced whenever the poles pass the partly alined portion.

It will be observed that if the field member were to rotate in a counter-clockwise direction, the N pole would then pass the partly alined section $p'$, the induced current in the coil would have the same direction as before, since it would be a decreasing N flux which generated it, and this induced current would as before establish a north field coöperating with the N pole at the left and opposing the S pole at the right, thus causing the flux conductors of the section $p'$ to aline, resulting in rotation in a counter-clockwise direction.

The direction of rotation of the driven member relative to that of the driver, is determined solely by the arrangement of the flux conductors. In Fig. 2, is shown an arrangement for rotation of the parts in opposition to each other. In this construction, the stationary flux conductors $2^a$ exceed in number the rotative flux conductors $3^a$, there being sixteen stationary flux conductors $2^a$, and fifteen rotatable flux conductors $3^a$, and hence the rotatable flux conductors $3^a$ in the portion $p'$ of Fig. 2 are partially off-set to the left and those in portion $p^3$ are partially off-set to the right, which is the reverse of the off-setting of the corresponding flux conductors in Fig. 1. Consequently, the rotation of the field in Fig. 2, in a clockwise direction will cause the rotatable member to rotate in a counter-clockwise direction and vice-versa.

In Fig. 3 is shown a construction which enables the driven member to be rotated with or against the field member. The direction of rotation of the driven member is determined by the position of the flux conductors in the portions intermediate the alined and fully off-set portions, as appears from Figs. 1 and 2. In the construction of Fig. 3, the teeth $2^{a\prime}$ of the portions $p'$ and $p^3$ are shiftable for a distance of half a tooth pitch, and with the teeth $2^{a\prime}$ in the position shown in full lines in Fig. 3, the driven member will rotate with the driver, while with the teeth $2^{a\prime}$ in the position shown in dotted lines, the driven member will rotate against the driver.

In Fig. 4 is shown another arrangement of the flux conductors. In this construction the stationary flux conductors are arranged in groups of four each, the spacing of the stationary and rotatable flux conductors being substantially the same as in Fig. 2, and therefore the driven member will rotate against the driver.

While in the illustrated constructions the induced winding 4 is shown on the stator, it may be arranged on either or on both of the rotatable members, the only requirement being that it encircle one section of approximately twice the pole pitch.

The apparatus therefore requires at least one section having portions in which the flux conductors are successively alined, partially off-set in one direction, fully off-set or staggered, and partially off-set in the opposite direction; it also requires an induced winding properly surrounding the section and carried by one or more of the elements, and a field system properly acting on the section and the winding.

It has been pointed out heretofore that the flux path for the N flux must be independent of the flux path for the S flux so that the fluxes are not interfered with when the reluctance of the paths differ. In Figs. 5 and 6 such an arrangement is shown. The machine illustrated in these figures includes two pairs of poles N' and S', and N² and S², the two N poles being disposed 180 mechanical degrees apart and the two S poles also being disposed 180 degrees apart and intermediate the N poles. The laminated field member 1 is mounted upon a drum or core 5 which is secured upon the driving shaft 6, and the magnetizing coils $n'$, $n^2$, $s'$ and $s^2$ are connected in series and their leads are connected to the slip rings 7 on the driving shaft 6 which are engaged by brushes 8 of the magnetizing circuit 9, a source of direct magnetizing current 10 being shown in the circuit.

The stationary flux conductors are arranged in two sections displaced with respect to one another the distance of half a tooth pitch. Since the induced currents are not in the same direction in the two sections, due to this displacement, separate induced windings 4 and $4^a$ are provided for the two sections, although by reversing one winding a single secondary circuit may in this instance be employed. The area of alinement opposing the N poles remains substantially constant, irrespective of the position of the field poles or the driven element, due to the displacement of one section relative to the other, and the same is also true at all times regarding the area of alinement opposing the S poles. The construction shown in Figs. 5 and 6 also has the movable teeth sections $2^{a'}$ to reverse the direction of rotation, as explained with reference to Fig. 3.

The laminated stationary member 2 is annular in shape and is carried on the inner periphery of the cylindrical portion of the frame or casing 11 of the machine. To carry and space the rotatable bars $3^a$, a ring 3 of non-magnetic material is employed, which fits in the annular space between the inner ends of the teeth $2^a$ and the outer pole faces of the field poles, and is integral with a bracket 12 which has a hub portion fixed upon the driven shaft 13. The ring 3 is provided with a series of longitudinal slots for the reception of the laminated bars $3^a$, these bars having a bifurcated inner end which fits over the ring 3 at the end of the slot, thereby holding the inner end of the bars against escaping from the slot; and the outer edge of the ring 3 is provided with a circumferential groove and the ends of the bars $3^a$ are correspondingly slotted so as to form a continuous groove when the bars are in place. A ring 14 of preferably non-magnetic material is secured in this groove and insulated from the walls thereof and holds the outer ends of the bars $3^a$ in place.

Since the adjacent N and S pole faces are spaced apart the distance between the alined and staggered portions in each section, it is manifest that, due to the off-setting of the two sections one-half a tooth pitch, when the north pole is opposing the alined portion in one section, the south pole will oppose the alined portion in the other section. This is illustrated in Fig. 5, and the independent flux path for the N flux of the pole N' includes the pole $S^2$ in the other section, and at all positions of the driving and driven members the path of the active or predominating flux in each section includes the pole of opposite polarity in the other section.

In the constructions shown in Figs. 1 to 6, inclusive, a torque impulse is produced each time that a pole passes a partly alined portion, at which moment the induced current, as well as the torque on the driven member, is at a maximum; and when the poles pass the alined or staggered sections, the induced current is zero and no torque exists. Therefore, as the field system rotates an intermittent torque is developed by the driven element.

In Figs. 7 and 8, a construction is illustrated which is capable of producing a practically continuous torque. This construction has three circumferential sections which are displaced one-third of a tooth pitch against one another, and the field member 1 has three pole pairs and a three-phase induced winding consisting of the phases 4, $4^a$ and $4^b$. The currents in the induced windings therefore reach their maximum values 120 electrical time degrees one after the other, thus causing the maximum torque impulses to succeed one another 120 electrical time degrees apart and therefore to merge into a continuous torque.

In this construction, as in the others, each of the induced windings encircles a north and south pole, the winding 4 encircling the poles N' and S', the winding $4^a$ encircling the poles $N^2$ and $S^2$ and the winding $4^b$ encircling the poles $N^3$ and $S^3$. The direction of the flux through each winding depends, of course, on which of the poles opposes the alined portions. If a north pole opposes the alined portion and a south pole opposes the staggered portion, the flux through the winding will be principally a north flux. However, a portion of the south flux will pass through the coil at the staggered portion and obviously subtract from the active value of the north flux, thus decreasing the generated potential since the difference is the active flux which generates the potential.

It is not desirable to employ a single large air gap at the alined portion, since this would cause the difference in the reluctance at the alined and staggered portions to be small with a consequent small active flux. A small air gap at the alined portion, however, limits the field ampere turns or the field strength for a permissible gap density and consequently also limits the ampere turns of the generated current in the induced winding. In Figs. 7 and 8, means are shown for increasing the effectiveness of the power apparatus by enabling an increase in the field ampere turns without materially changing the active flux. In this construction, a plurality of series of rotatable and stationary flux conductors are employed, the alternate series being stationary and the intermediate series being rotatable, and the conductors of the respective series being radially alined.

As shown, two concentric series of stationary laminated bars 2ᵇ and 2ᶜ are supported upon a stationary bracket 15 carried by the casing 11, the bracket having two integral ring portions 16 and 17 (see Fig. 9) in slots of which the laminated bars of the respective series are carried, as described with reference to the bars 3ᵃ. The bars of the two series 2ᵇ and 2ᶜ are arranged in radial alinement with the teeth 2ᵃ. The bars 3ᵃ are arranged between the teeth 2ᵃ and the bars 2ᵇ, while the second series of rotatable bars 3ᵇ, which in this instance are carried in slots of another ring portion 3′ forming a flange of the bracket 12 concentric with the ring 3, are disposed between the series of stationary bars 2ᵇ and 2ᶜ, the bars of the series 3ᵃ, 3ᵇ being in radial alinement.

In this way the total air gap at the alined portions is multiplied, enabling a proportionately greater field strength, as well as induced current, without changing or decreasing the difference between the alined and unalined fluxes, since the gap at the unalined portions has been proportionately increased. In other words, the same great active flux is retained.

The power of the apparatus may be still further increased by supplying a leading magnetizing current to the induced circuits, which may be done by inserting condensers 18, 19 and 20 in the respective induced circuits 4, 4ᵃ, 4ᵇ. These condensers produce an energizing current in the induced circuits which is at its maximum when a pole is opposing an alined portion, the current having such direction as to strengthen such pole. By far the more important action, however, of this leading magnetizing current is to materially reduce the opposed flux. This energizing current in the induced windings opposes the pole at the staggered portion and thereby weakens it, resulting in a greater active flux and a consequent higher voltage in the induced windings; the pole under the alined portion can be strengthened by increasing the continuous energizing current, but it requires the magnetizing current in the induced circuit to reduce the opposing flux.

To vary the torque and speed of the driven member, it is only necessary to change the field strength of the field member, which may be done by a variable resistance 21 in the magnetizing circuit; or to vary the resistance of the induced circuits, which may also be done by variable resistance 22, 23 and 24, in the induced circuits; or to change the value of the leading magnetizing currents in the secondary circuits by changing the capacity of the condensers. It will also be observed that a change in the value of the condenser currents results from a change in the field strength of the field member.

It is obvious that various modifications may be made in the constructions shown in the drawings and above particularly described within the principle and scope of my invention.

I claim:

1. An induction device comprising a stationary member having a plurality of spaced magnetic conductors, a movable member having a plurality of spaced magnetic conductors coöperative with those of the stationary member to form at least one section having portions in which the conductors of the two members are alined, partly off-set in one direction, fully off-set, and partly off-set in the opposite direction, an induced winding surrounding the section, and a progressive magnetic field traversing the section and acting on the induced winding.

2. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly off-set in one direction, fully off-set, and partly off-set in the opposite direction, an induced winding surrounding the sections, and a revolving magnetic field traversing the section and acting on the induced winding.

3. An induction power transmission device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having successive portions in which the conductors of the two members are respectively alined, partly off-set in one direction, fully off-set, and partly off-set in the opposite direction, an induced winding surrounding the section, and a revolving magnetic field traversing the section and acting on the induced winding and having its poles of opposite polarity spaced the distance between the alined and fully off-set portions.

4. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly off-set in one direction, fully off-set, and partly off-set in the opposite direction, an induced winding surrounding the sections, and a rotative field magnet arranged with its flux traversing the section and acting on the induced winding as the magnet rotates.

5. An induction power transmission device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates having greater angular velocity than that of the rotative member, the conductors of the two members coöperating to form at least one circumferential section having successive portions in which the conductors of the two members are respectively alined, partly offset in one direction, fully offset, and partly offset in the opposite direction, an induced winding surrounding the section, and a revolving magnetic field traversing the section and acting on the induced winding, whereby the flux path is caused to follow the magnetic field as the rotatable member is rotated.

6. An induction power transmission device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates having greater angular velocity than that of the rotative member, the conductors of the two members coöperating to form at least one circumferential section having successive portions in which the conductors of the two members are respectively alined, partly offset in one direction, fully offset, and partly offset in the opposite direction, an induced winding surrounding the section, and a rotative field magnet having its poles of opposite polarity spaced the distance between the alined and fully-offset portions and having a positive and a negative flux traversing the section and acting on the induced winding as the magnet rotates, whereby the flux path is caused to follow the magnetic field as the rotatable member is rotated.

7. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly offset in one direction, fully offset, and partly offset in the opposite direction, an induced winding surrounding the sections, and a rotative field member having a negative flux and a positive flux traversing the section and acting on the induced winding as the magnet rotates, the field member including means for completing separate paths for the fluxes.

8. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly offset in one direction, fully offset, and partly offset in the opposite direction, an induced winding surrounding the sections, and a rotative field member having two field magnets, the negative pole face of one magnet being spaced from the positive pole face of the other magnet the distance between the alined and fully offset portions and the two pole faces being arranged with their fluxes traversing the section and acting on the induced winding as the magnet rotates.

9. An induction power transmission device comprising a stationary member having a plurality of circularly disposed spaced magnetic conductors arranged in a plurality of sections offset from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly offset in one direction, fully offset, and partly offset in the opposite direction, an induced winding surrounding each section, and a revolving magnetic field traversing the sections and acting on the induced windings and conductors.

10. An induction power transmission device comprising a stationary member having a plurality of circularly disposed spaced magnetic conductors arranged in a plurality of sections offset from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly offset in one direction, fully offset, and partly offset in the opposite direction, an induced winding surrounding each section, and a revolving magnetic field traversing the sections and acting on the induced windings and conductors, the offsetting of the sections of the stationary member being such that the sum of the negative flux in all the sections equals that of the positive flux.

11. An induction power transmission device comprising a stationary member having a plurality of circularly disposed spaced magnetic conductors arranged in a plurality of sections offset from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly offset in one direction, fully offset, and partly offset in the opposite direction, an induced winding surrounding each section, and a rotative field magnet having a negative flux and a positive flux traversing the sections and acting on the induced windings and on the portions as the magnet rotates.

12. An induction power transmission device comprising a stationary member having a plurality of circularly disposed spaced magnetic conductors arranged in a plurality of sections offset from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly offset in one direction, fully offset, and partly offset in the opposite direction, and induced winding surrounding each section, and a rotative field member arranged with its flux traversing the sections and acting on the induced windings as the field member rotates, the field member having a plurality of field magnets double in number to that of the said sections, the flux of the alternate magnets being of one polarity and the flux of the intermediate magnets being of opposite polarity and the magnets being spaced the distance between the alined and fully offset portions.

13. An induction power transmission device comprising a stationary member having a plurality of circularly disposed spaced magnetic conductors arranged in a plurality of sections offset from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly offset in one direction, fully offset, and partly offset in the opposite direction, an induced winding surrounding each section, a rotative field member mounted co-axially with and arranged with its flux traversing the stationary and rotatable members and having a plurality of pole pieces double in number to that of the said sections and spaced apart the distance between the alined and fully offset portions, and a magnetizing circuit for the field member including magnetizing coils for the pole pieces wound to produce successive positive and negative poles.

14. An induction power transmission device comprising an annular external stationary member having on its inner periphery a plurality of circularly disposed spaced magnetic conductors arranged in a plurality of circumferential sections offset from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly offset in one direction, fully offset, and partly offset in the opposite direction, an induced winding surrounding each section, an internal rotative field member having a plurality of radial pole pieces double in number to that of the said sections, the outer pole faces of the pole pieces being adjacent the intermediate rotatable member and being spaced apart the distance between the alined and fully offset portions, and a magnetizing circuit for the field member including magnetizing coils for the pole pieces wound to form outer pole faces of alternate polarity.

15. An induction power transmission device comprising a stationary member having a plurality of concentric series of circularly arranged spaced magnetic conductors, the conductors of the several series being radially alined, a rotatable member having a plurality of concentric series of circularly arranged spaced magnetic conductors, the conductors of the several series being radially alined and coöperative with those of the stationary member to complete a rotative flux path as the rotatable member rotates, the conductors of the two members coöperating to form at least one circumferential section having successive portions in which the conductors of the two members are respectively alined, partly off-set in one direction, fully offset, and partly offset in the opposite direction, an induced winding surrounding the section, and a revolving magnetic field traversing the sections and acting on the induced winding.

16. An induction power transmission device comprising a stationary member having a plurality of concentric series of circularly arranged spaced magnetic conductors, the conductors of the several series being radially alined, a rotatable member having a plurality of concentric series of circularly arranged spaced magnetic conductors, the conductors of the several series being radially alined and coöperative with those of the stationary member to complete a rotative flux path as the rotatable member rotates, the conductors of the two members coöperating to form at least one circumferential section having successive portions in which the conductors of the two members are respectively alined, partly off-set in one direction, fully off-set, and partly off-set in the opposite direction, an induced winding surrounding the section, and a rotative field magnet having its poles of opposite polarity spaced the distance between the alined and fully off-set portions and having a positive and a negative flux traversing the stationary and movable members and acting on the induced winding as the magnet rotates, whereby the flux path is caused to follow the magnetic field as the rotatable member is rotated.

17. An induction power transmission device comprising an annular external stationary member having on its inner side a plurality of concentric series of circularly arranged spaced magnetic conductors, the conductors of the several series being radially alined and arranged in a plurality of circumferential sections off-set from each other a fraction of the pitch of the magnetic conductors, an intermediate rotatable member having a plurality of concentric series of circularly arranged spaced magnetic conductors, the conductors of the several series being radially alined and coöperative with those of the stationary member to form successive portions in each section in which the conductors of the two members are respectively alined, partly off-set in one direction, fully off-set, and partly off-set in the opposite direction, an induced winding surrounding each section, an internal rotative field member having a plurality of radial pole pieces double in number to that of the said sections, the outer pole faces of the pole pieces being adjacent the intermediate rotatable member and being spaced apart the distance between the alined and fully off-set portions, and a magnetizing circuit for the field member wound to form outer pole faces of alternate polarity.

18. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly off-set in one direction, fully off-set, and partly off-set in the opposite direction, an induced winding surrounding the sections, means for producing a leading magnetizing current in the induced circuit, and a revolving magnetic field traversing the stationary and rotatable members and acting on the induced winding.

19. An induction power transmission device comprising a stationary member having a plurality of circularly disposed spaced magnetic conductors arranged in a plurality of sections off-set from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, means for producing a leading magnetizing current in each induced circuit, and a revolving magnetic field transversing the stationary and rotatable members and acting on the induced windings and conductors.

20. An induction power transmission device comprising an annular external stationary member having on its inner periphery a plurality of circularly disposed spaced magnetic conductors arranged in a plurality of circumferential sections off-set from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, a condenser in each induced circuit, an internal rotative field member having a plurality of radial pole pieces double in number to that of the said sections, the outer pole faces of the pole pieces being adjacent the intermediate rotatable member and being spaced apart the distance between the alined and fully off-set portions, and a magnetizing circuit for the field member including magnetizing coils for the pole pieces wound to form outer pole faces of alternate polarity.

21. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly off-set in one direction, fully off-set, and partly off-set in the opposite direction, an induced winding surrounding the section, a revolving magnetic field traversing the stationary and rotatable members and acting on the induced winding, and means for varying the strength of the magnetic field.

22. An induction power transmission device comprising an annular external stationary member having on its inner periphery a plurality of circularly disposed spaced magnetic conductors arranged in a plurality of circumferential sections off-set from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, an internal rotative field member having a plurality of radial pole pieces double in number to that of the said sections, the outer pole faces of the pole pieces being adjacent the intermediate rotatable member and being spaced apart the distance between the alined and fully off-set portions, a magnetizing circuit for the field member including magnetizing coils for the pole pieces wound to form outer pole faces of alternate polarity, and a variable resistance in the magnetizing circuit.

23. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section to form at least one circumferential section having portions in which the conductors of the two members are alined, partly off-set in one direction, fully off-set, and partly off-set in the opposite direction, an induced winding surrounding the section, a variable resistance in the induced circuit, and a revolving magnetic field traversing the stationary and rotatable members and acting on the induced winding.

24. An induction power transmission device comprising an annular external stationary member having on its inner periphery a plurality of circularly disposed spaced magnetic conductors arranged in a plurality of circumferential sections off-set from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, a variable resistance in each induced circuit, an internal rotative field member having a plurality of radial pole pieces double in number to that of the said sections, the outer pole faces of the pole pieces being adjacent the intermediate rotatable member and being spaced apart the distance between the alined and fully off-set portions, and a magnetizing circuit for the field member including magnetizing coils for the pole pieces wound to form outer pole faces of alternate polarity.

25. An induction power transmission device comprising an annular external stationary member having on its inner periphery a plurality of circularly disposed spaced magnetic conductors arranged in a plurality of circumferential sections off-set from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, a condensed and a variable resistance in each induced circuit, an internal rotative field member having a plurality of radial pole pieces double in number to that of the said sections, the outer pole faces of the pole pieces being adjacent the intermediate rotatable member and being spaced apart the distance between the alined and fully off-set portions, and a magnetizing circuit for the field member including magnetizing coils for the pole pieces wound to form outer pole faces of alternate polarity.

26. An induction power transmission device comprising a stationary member having a plurality of circularly disposed spaced magnetic conductors arranged in a plurality of sections off-set from each other a fraction of the pitch of the magnetic conductors, a rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, a variable resistance in each induced circuit, a revolving magnetic field traversing the stationary and rotatable members and acting on the induced windings and conductors, and means for varying the strength of the magnetic field.

27. An induction power transmission device comprising an annular external stationary member having on its inner periphery a plurality of circularly disposed spaced magnetic conductors arranged in a plurality of circumferential sections off-set from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, a variable resistance in each induced circuit, an internal rotative field member having a plurality of radial pole pieces double in number to that of the said sections, the outer pole faces of the pole pieces being adjacent the intermediate rotatable member and being spaced apart the distance between the alined and fully off-set portions, a magnetizing circuit for the field member including magnetizing coils for the pole pieces wound to form outer pole faces of alternate polarity, and a variable resistance in the magnetizing circuit.

28. An induction power transmission device comprising an annular external stationary member having on its inner periphery a plurality of circularly disposed spaced magnetic conductors arranged in a plurality of circumferential sections off-set from each other a fraction of the pitch of the magnetic conductors, an intermediate rotatable member having a plurality of circularly arranged spaced magnetic conductors coöperative with those of the stationary member to form successive portions in each section in which the conductors of the two members are respectively alined, partly off-set in one direction, fully off-set, and partly off-set in the opposite direction, an induced winding surrounding each section, a condenser and a variable resistance in each induced circuit, an internal rotative field member having a plurality of radial pole pieces double in number to that of the said sections, the outer pole faces of the pole pieces being adjacent the intermediate rotatable member and being spaced apart the distance between the alined and fully off-set portions, a magnetizing circuit for the field member including magnetizing coils for the pole pieces wound to form outer pole faces of alternate polarity, and a variable resistance in the magnetizing circuit.

29. An induction device comprising a stationary member having a plurality of circularly arranged spaced magnetic conductors, a rotatable member having a plurality of circularly arranged spaced magnetic conductors coöperative with those of the stationary member to complete a rotative flux path as the rotatable member rotates, the conductors of the two members coöperating to form at least one circumferential section having portions in which the conductors of the two members are alined, partly off-set in one direction, fully off-set, and partly off-set in the opposite direction, an induced winding surrounding the sections, a revolving magnetic field traversing the stationary and rotatable members and acting on the induced winding, and having its poles of opposite polarity spaced the distance between the alined and fully off-set portion, the flux of the pole opposite the alined portion being active in inducing a potential in the induced circuit and the flux of the pole opposite the fully off-set portion being opposed to said active flux, and means for reducing the opposing flux.

30. A dynamo electric machine comprising a rotatable member and a coöperative stationary member, the coöperative faces of the two members being shaped to form two progressive partially closed flux paths between the members as the rotative member rotates, a progressive magnetic field traversing the two members, the two paths being so formed that the magnetic flux traversing them produces opposing magnetic pulls on the rotatable member, and an induced circuit acted on by the progressing magnetic field and so arranged that the secondary magnetic field thereby induced strengthens the flux traversing one path and weakens the flux traversing the other path.

31. A dynamo electric machine comprising a rotatable member and a coöperative stationary member, the coöperative faces of the two members being shaped to form two progressive partially closed flux paths between the members as the rotative member rotates having greater angular velocity than that of the rotative member, a progressive magnetic field traversing the two members, the two paths being so formed that the magnetic flux traversing them produces opposing magnetic pulls on the rotatable member, and an induced circuit acted on by the progressing magnetic field and so arranged that the secondary magnetic field thereby induced strengthens the flux traversing one path and weakens the flux traversing the other path.

In witness whereof I subscribe my signature, in the presence of two witnesses.

ALFONS H. NEULAND.

Witnesses:
VICTOR D. BORST,
WALDO M. CHAPIN.